(12) United States Patent
Park et al.

(10) Patent No.: US 8,578,195 B2
(45) Date of Patent: Nov. 5, 2013

(54) IMAGE FORMING APPARATUS, SYSTEM ON CHIP UNIT AND DRIVING METHOD THEREOF

(75) Inventors: Ho-beom Park, Suwon-si (KR); Sung-uk Bin, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 383 days.

(21) Appl. No.: 12/878,305

(22) Filed: Sep. 9, 2010

(65) Prior Publication Data

US 2011/0060929 A1 Mar. 10, 2011

(30) Foreign Application Priority Data

Sep. 9, 2009 (KR) .............................. 2009-0084921
Jun. 18, 2010 (KR) .............................. 2010-0058266

(51) Int. Cl.
*G06F 1/26* (2006.01)
*G06F 1/32* (2006.01)

(52) U.S. Cl.
USPC ............ 713/323; 713/320; 713/322; 713/324

(58) Field of Classification Search
USPC .................................. 713/320, 322, 323, 324
See application file for complete search history.

(56) References Cited

U.S. PATENT DOCUMENTS

| | | | |
|---|---|---|---|
| 6,903,830 B1 | 6/2005 | Hane et al. | |
| 7,797,556 B2 * | 9/2010 | Yamamoto | 713/300 |
| 2002/0144023 A1 * | 10/2002 | Kawabuchi et al. | 710/5 |
| 2003/0197886 A1 | 10/2003 | Fujinaga et al. | |
| 2004/0073824 A1 * | 4/2004 | Machida | 713/323 |
| 2005/0007628 A1 | 1/2005 | Yamano et al. | |
| 2005/0021728 A1 * | 1/2005 | Sugimoto | 709/223 |
| 2007/0260358 A1 | 11/2007 | Katoh | |
| 2008/0034240 A1 * | 2/2008 | Park | 713/323 |
| 2008/0088634 A1 * | 4/2008 | Thompson et al. | 345/520 |
| 2009/0063878 A1 | 3/2009 | Schmidt et al. | |
| 2009/0199022 A1 | 8/2009 | Fukuda | |
| 2009/0207423 A1 | 8/2009 | Shimizu et al. | |
| 2009/0235103 A1 * | 9/2009 | Yamashiro | 713/324 |

(Continued)

FOREIGN PATENT DOCUMENTS

EP 1 035 499 A2 9/2000
JP 2000-326590 11/2000

OTHER PUBLICATIONS

European Search Report dated Dec. 16, 2010 and issued in corresponding European Patent Application 10175863.9.

(Continued)

*Primary Examiner* — Vincent Tran
(74) *Attorney, Agent, or Firm* — Staas & Halsey LLP

(57) ABSTRACT

An image forming apparatus which is connected to a host apparatus, the image forming apparatus including a first memory, a second memory, a universal serial bus (USB) interface to receive a USB control signal or a USB data signal from the host apparatus, and a central processing unit (CPU) operating in a normal mode using the first memory or a power saving mode using the second memory. If the USB data signal is input in the power saving mode, the CPU activates the first memory and converts the power saving mode into the normal mode, and, if the USB control signal is input in the power saving mode, the CPU retains the power saving mode and performs an operation corresponding to the USB control signal using the second memory. Accordingly, the power saving mode is realized effectively.

11 Claims, 11 Drawing Sheets

(56) References Cited

U.S. PATENT DOCUMENTS

| | | |
|---|---|---|
| 2009/0282278 A1 | 11/2009 | Satoh |
| 2009/0323120 A1 | 12/2009 | Yamanaka |
| 2011/0058214 A1* | 3/2011 | Park et al. .................... 358/1.15 |

OTHER PUBLICATIONS

Korean Office Action dated Jan. 4, 2012 issued in corresponding Korean Patent Application No. 10-2010-0058266.
U.S. Office Action issued Aug. 20, 2013 in copending U.S. Appl. No. 13/777,656.

* cited by examiner

| Transfer | H | Control | ADDR | ENDP | D | Tp | R | bRequest | wValue | wIndex | wLength | Bytes Transferred | Time | Time Stamp |
|---|---|---|---|---|---|---|---|---|---|---|---|---|---|---|
| 48 | S | GET | 1 | 0 | D->H | V | I | 0x0A | 0x0001 | 0x0100 | 8 | 8 | 931.077ms | 00029.0550 4209 |
| Transfer | H | Control | ADDR | ENDP | D | Tp | R | bRequest | wValue | wIndex | wLength | Bytes Transferred | Time | Time Stamp |
| 49 | S | GET | 1 | 0 | D->H | C | I | 0x00 | 0x0000 | 0x0100 | 257 | 110 | 882.346ms | 00029.7999 1301 |
| Transfer | H | Control | ADDR | ENDP | D | Tp | R | bRequest | wValue | wIndex | wLength | Bytes Transferred | Time | Time Stamp |
| 50 | S | GET | 1 | 0 | D->H | C | I | 0x00 | 0x0000 | 0x0100 | 257 | 110 | 390.033μs | 00030.7057 7061 |
| Transfer | H | Control | ADDR | ENDP | D | Tp | R | bRequest | wValue | wIndex | wLength | Bytes Transferred | Time | Time Stamp |
| 51 | S | GET | 1 | 0 | D->H | V | I | 0x0A | 0x0000 | 0x0100 | 8 | 8 | 326.967μs | 00030.7061 0463 |
| Transfer | H | Control | ADDR | ENDP | D | Tp | R | bRequest | wValue | wIndex | wLength | Bytes Transferred | Time | Time Stamp |
| 52 | S | GET | 1 | 0 | D->H | V | I | 0x0A | 0x0001 | 0x0100 | 8 | 8 | 29.840ms | 00030.7063 5081 |
| Transfer | H | Control | ADDR | ENDP | D | Tp | R | bRequest | wValue | wIndex | wLength | Bytes Transferred | Time | Time Stamp |
| 53 | S | GET | 1 | 0 | D->H | C | I | 0x00 | 0x0000 | 0x0100 | 257 | 110 | 303.633μs | 00030.7302 3003 |
| Transfer | H | Control | ADDR | ENDP | D | Tp | R | bRequest | wValue | wIndex | wLength | Bytes Transferred | Time | Time Stamp |
| 54 | S | GET | 1 | 0 | D->H | V | I | 0x0A | 0x0000 | 0x0100 | 8 | 8 | 230.933μs | 00030.7304 6221 |
| Transfer | H | Control | ADDR | ENDP | D | Tp | R | bRequest | wValue | wIndex | wLength | Bytes Transferred | Time | Time Stamp |
| 55 | S | GET | 1 | 0 | D->H | V | I | 0x0A | 0x0001 | 0x0100 | 8 | 8 | 27.268ms | 00030.7306 5077 |
| Transfer | H | Control | ADDR | ENDP | D | Tp | R | bRequest | wValue | wIndex | wLength | Bytes Transferred | Time | Time Stamp |
| 56 | S | GET | 1 | 0 | D->H | C | I | 0x00 | 0x0000 | 0x0100 | 257 | 110 | 390.133μs | 00030.7524 6175 |
| Transfer | H | Control | ADDR | ENDP | D | Tp | R | bRequest | wValue | wIndex | wLength | Bytes Transferred | Time | Time Stamp |
| 57 | S | GET | 1 | 0 | D->H | V | I | 0x0A | 0x0000 | 0x0100 | 8 | 8 | 216.533μs | 00030.7527 7083 |
| Transfer | H | Control | ADDR | ENDP | D | Tp | R | bRequest | wValue | wIndex | wLength | Bytes Transferred | Time | Time Stamp |
| 58 | S | GET | 1 | 0 | D->H | V | I | 0x0A | 0x0001 | 0x0100 | 8 | 8 | 164.119ms | 00030.7529 5075 |
| Transfer | H | Control | ADDR | ENDP | D | Tp | R | bRequest | wValue | wIndex | wLength | Bytes Transferred | Time | Time Stamp |
| 59 | S | GET | 1 | 0 | D->H | C | I | 0x00 | 0x0000 | 0x0100 | 257 | 110 | 289.067μs | 00031.0842 4729 |
| Transfer | H | Control | ADDR | ENDP | D | Tp | R | bRequest | wValue | wIndex | wLength | Bytes Transferred | Time | Time Stamp |
| 60 | S | GET | 1 | 0 | D->H | V | I | 0x0A | 0x0000 | 0x0100 | 8 | 8 | 216.467μs | 00031.0844 7073 |
| Transfer | H | Control | ADDR | ENDP | D | Tp | R | bRequest | wValue | wIndex | wLength | Bytes Transferred | Time | Time Stamp |
| 61 | S | GET | 1 | 0 | D->H | V | I | 0x0A | 0x0001 | 0x0100 | 8 | 8 | 209.480ms | 00031.0846 5061 |
| Transfer | H | Control | ADDR | ENDP | D | Tp | R | bRequest | wValue | wIndex | wLength | Bytes Transferred | Time | Time Stamp |
| 62 | S | GET | 1 | 0 | D->H | C | I | 0x00 | 0x0000 | 0x0100 | 257 | 110 | 331.500μs | 00031.2522 3853 |
| Transfer | H | Control | ADDR | ENDP | D | Tp | R | bRequest | wValue | wIndex | wLength | Bytes Transferred | Time | Time Stamp |
| 63 | S | GET | 1 | 0 | D->H | V | I | 0x0A | 0x0000 | 0x0100 | 8 | 8 | 318.067μs | 00031.2525 1243 |
| Transfer | H | Control | ADDR | ENDP | D | Tp | R | bRequest | wValue | wIndex | wLength | Bytes Transferred | Time | Time Stamp |
| 64 | S | GET | 1 | 0 | D->H | V | I | 0x0A | 0x0001 | 0x0100 | 8 | 8 | 377.724ms | 00031.2527 5327 |
| Transfer | H | Bulk | ADDR | ENDP | Bytes Transferred | | | | | | | Time | Time Stamp | |
| 65 | S | OUT | 1 | 1 | 4096 | | | | | | | 3.646ms | 00031.5549 3753 | |
| Transfer | H | Bulk | ADDR | ENDP | Bytes Transferred | | | | | | | Time | Time Stamp | |
| 66 | S | OUT | 1 | 1 | 4096 | | | | | | | 2.604ms | 00031.5578 5013 | |

IMAGE FORMING APPARATUS, SYSTEM ON CHIP UNIT AND DRIVING METHOD THEREOF

CROSS-REFERENCE TO RELATED APPLICATIONS

This application claims the benefit of Korean Patent Application No. 10-2009-0084921, filed on Sep. 9, 2009, and No. 10-2010-0058266, filed on Jun. 18, 2010, in the Korean Intellectual Property Office, the disclosures of which are incorporated herein by reference.

BACKGROUND

1. Field

Aspects relate to an image forming apparatus, a system on chip (SoC) unit, and a driving method thereof, and more particularly, to an image forming apparatus and a SoC unit which have a universal serial bus (USB) communication function, and a driving method thereof.

2. Description of the Related Art

A power saving mode refers to a mode in which power supplied to most of the modules is interrupted or minimized in order to minimize power consumption when a system is idle. In order to reduce standby power, a method of interrupting power supplied to a main memory (an external dynamic random access memory (DRAM) in general) or getting a system in a self refresh state and then driving a program in an unused internal memory of a SoC (an internal static random access memory (SRAM) in general) may be used. In general, the SRAM uses a low capacity memory of about 128 KB.

However, if it is necessary to transmit a great amount of data as in a USB driver for a printer or a mass storage device or if the number of supported interfaces increases, a space occupied by stack increases and thus it is difficult to perform all functions of the USB driver in the low capacity SRAM.

Also, since the SRAM is expensive, a high capacity SRAM is ineffective in view of a cost.

If an apparatus used as a USB device interrupts power supplied to the external DRAM in order to enter the power saving mode, the USB driver operating in the external DRAM is also stopped so that the USB device does not communicate with a host device. In particular, in the case of a printer which receives a specific command from a host apparatus through a USB, the printer is not able to perform its original function (a problem that a personal computer recognizes the printer as being disconnected). Therefore, in the related art, the external DRAM is normally operated even in the power saving mode.

However, if power continues to be supplied to the external DRAM, standby power is consumed. On the other hand, if power supplied to the DRAM is interrupted in order to reduce power consumption, the USB driver operating in response to the external DRAM is also stopped so that communication using the USB is impossible. However, in this case, if a program for checking an apparatus status using the USB gets access to the apparatus, it determines that power is turned off and thus there is an inconvenience in using a service. For example, if a personal computer is connected to a printer through a USB and a print monitoring program is installed in the PC, there is a problem that the PC may recognize the printer as being in an abnormal state or being disconnected when the DRAM of the printer is turned off and the USB driver does not operate.

SUMMARY

Accordingly, it is an aspect to provide an image forming apparatus which realizes a power saving mode effectively and a driving method thereof.

Additional aspects and/or advantages will be set forth in part in the description which follows and, in part, will be apparent from the description, or may be learned by practice of the invention.

The foregoing and/or other aspects are achieved by providing an image forming apparatus which is connected to a host apparatus, including: a first memory, a second memory, a universal serial bus (USB) interface to receive a USB control signal or a USB data signal from the host apparatus, and a central processing unit (CPU) operating in a normal mode using the first memory or in a power saving mode using the second memory, wherein, if the USB data signal is input in the power saving mode, the CPU activates the first memory and converts the power saving mode into the normal mode, and, if the USB control signal is input in the power saving mode, the CPU retains the power saving mode and performs an operation corresponding to the USB control signal using the second memory.

The USB data signal may be a request signal for an image forming job.

The CPU may interrupt power supplied to the first memory or retain the first memory in a self-refresh state in the power saving mode.

The second memory and the CPU may be provided inside a system on chip (SoC), and the USB interface may be provided inside or outside the SoC.

If the image forming apparatus enters the power saving mode, the CPU may copy a program for controlling the power saving mode from the first memory to the second memory.

The program for controlling the power saving mode may include at least one of a routine for determining whether a signal is input to the USB interface or not, a routine for performing an operation according to the USB control signal, and a routine required in a wake up process for converting the power saving mode into the normal mode.

The USB control signal may be input through a control endpoint, and the USB data signal may be input through a bulk type in/out endpoint.

The foregoing and/or other aspects may also be achieved by providing an image forming apparatus which is connected to a host apparatus, including: a first memory, a second memory, a USB interface to receive a USB control signal or a USB data signal from the host apparatus, a first CPU to perform an operation using the first memory in a normal mode and being deactivated if the normal mode is converted into a power saving mode, and a second CPU to perform an operation using the second memory in the power saving mode, wherein, if the USB data signal is input in the power saving mode, the second CPU activates the first CPU to convert the power saving mode into the normal mode, and if the USB control signal is input in the power saving mode, the second CPU retains the power saving mode and performs an operation corresponding to the USB control signal using the second memory.

The USB data signal may be a request signal for an image forming job.

The second CPU may interrupt power supplied to the first CPU or retain the first memory in a self-refresh state in the power saving mode.

The foregoing and/or other aspects may also be achieved by providing a SoC unit which is mountable on an apparatus having a volatile memory, the SoC unit including: a memory, a USB interface to receive a USB control signal or a USB data signal from an external apparatus connected to the apparatus, and a CPU to perform an operation using the volatile memory in a normal mode and perform an operation using the memory in a power saving mode, wherein, if the USB data signal is input in the power saving mode, the CPU converts the power saving mode into the normal mode and performs an operation corresponding to the USB data signal, and if the USB control signal is input in the power saving mode, the CPU retains the power saving mode and performs an operation corresponding to the USB control signal using the memory.

The foregoing and/or other aspects may also be achieved by providing a driving method of an image forming apparatus which is connected to a host apparatus, includes a first memory, a second memory, and a USB interface to receive a USB control signal or a USB data signal from the host apparatus, and operates in a normal mode using the first memory or in a power saving mode using the second memory, the driving method including: detecting a signal that is input from the host apparatus in the power saving mode, and if the input signal is the USB control signal, retaining the power saving mode and performing an operation corresponding to the USB control signal using the second memory, and if the input signal is the USB data signal, converting the power saving mode into the normal mode to activate the first memory and performing an operation corresponding to the USB data signal using the activated first memory.

The USB data signal may be a request signal for an image forming job.

In the power saving mode, power supplied to the first memory may be interrupted or the first memory may be retained in a self-refresh state.

The driving method may further include, if the image forming apparatus enters the power saving mode, copying a program stored in the first memory for controlling the power saving mode to the second memory.

The program for controlling the power saving mode includes at least one of a routine for determining whether a signal is input to the USB interface or not, a routine for performing an operation corresponding to the USB control signal, and a routine required in a wake-up process for converting the power saving mode into the normal mode.

The USB control signal may be input through a control end point and the USB data signal may be input through a bulk type in/out endpoint.

The foregoing and/or other aspects may also be achieved by providing a driving method of an image forming apparatus which is connected to a host apparatus, includes a first memory, a second memory, a first CPU to perform an operation using the first memory in a normal mode and being deactivated if the normal mode is converted into a power saving mode, and a second CPU to perform an operation using the second memory in the power saving mode, the driving method including: detecting a signal that is input from the host apparatus in the power saving mode, and if the input signal is the USB control signal, retaining the power saving mode and performing an operation corresponding to the USB control signal using the second memory, and if the input signal is the USB data signal, activating the first CPU and converting the power saving mode into the normal mode.

The USB data signal may be a request signal for an image forming job.

In the power saving mode, power supplied to the first CPU may be interrupted or the first memory may be retained in a self-refresh state.

The foregoing and/or other aspects may also be achieved by providing a driving method of a SoC unit which is mountable on an apparatus having a volatile memory accessible in a normal mode, and includes a USB interface to receive a USB control signal or a USB data signal from an external apparatus connected to the apparatus, and a memory, the driving method including: detecting a signal that is input from the apparatus in the power saving mode; and if the input signal is the USB data signal, converting the power saving mode into the normal mode, and if the input signal is the USB control signal, retaining the power saving mode and performing an operation corresponding to the USB control signal using the memory.

The foregoing and/or other aspects may also be achieved by providing a storage medium in which a program code for executing a driving method of an image forming apparatus is stored, the image forming apparatus being connected to a host apparatus, including a first memory, a second memory, and a USB interface to receive a USB control signal or a USB data signal from the host apparatus, and operating in a normal mode using the first memory or in a power saving mode using the second memory, the driving method including: detecting a signal that is input from the host apparatus in the power saving mode, and if the input signal is the USB control signal, retaining the power saving mode and performing an operation corresponding to the USB control signal using the second memory, and if the input signal is the USB data signal, converting the power saving mode into the normal mode and performing an operation corresponding to the USB data signal.

Accordingly, the power saving mode is realized effectively.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a view illustrating a USB packet analysis frame according to an exemplary embodiment;

DETAILED DESCRIPTION

Figure 1A:
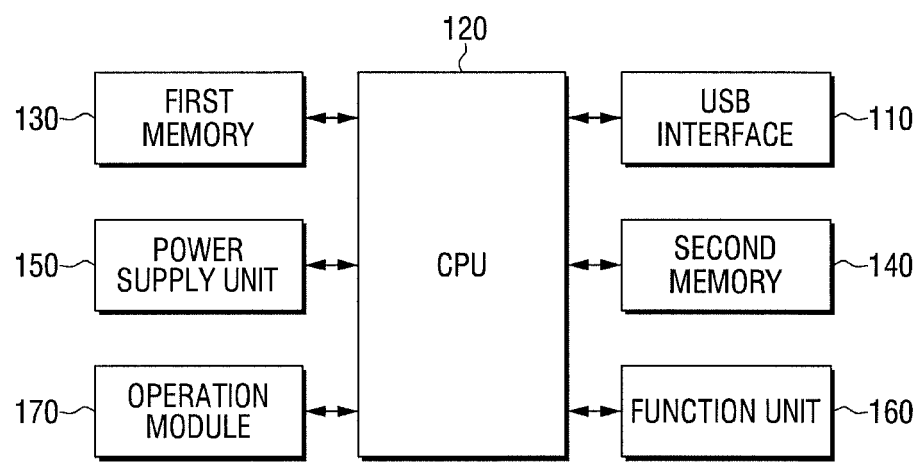
FIG. 1A is a block diagram illustrating an image forming apparatus according to an exemplary embodiment.

Reference will now be made in detail to the present embodiments, examples of which are illustrated in the accompanying drawings, wherein like reference numerals refer to the like elements throughout. The embodiments are described below in order to explain the embodiments by referring to the figures.

FIG. 1A is a block diagram illustrating an image forming apparatus according to an exemplary embodiment.

Referring to FIG. 1A, an image forming apparatus 100 includes a universal serial bus (USB) interface 110, a central processing unit (CPU) 120, a first memory 130, a second memory 140, a power supply unit 150, a function unit 160, and an operation module 170.

The image forming apparatus 100 may be realized as a printer, a copier, a scanner, a facsimile machine, or a multi-function peripheral (MFP) combining the functions of the aforementioned devices in a single device.

The USB interface 110 functions to USB communicate with at least one external apparatus. The at least external apparatus may be a host apparatus such as a personal computer (PC).

More specifically, the USB interface 110 may perform USB control communication and USB data communication with the at least one external apparatus. That is, the USB interface 110 may receive a USB control signal and a USB data signal from the at least one external apparatus. The USB interface 110 may be an endpoint which is a logic point defined in the USB specification and a detailed description thereof will be given below.

The CPU 120 controls the overall operation of the image forming apparatus 100, and more particularly, may operate in a normal mode in which the first memory 130 is used or a power saving mode in which the second memory 140 is used.

More specifically, the CPU 120 converts the power saving mode into the normal mode when the USB data signal is input, thereby activating the first memory 130 and performing an operation corresponding to the USB data signal using the activated first memory 130. The USB data signal recited herein may be a request signal regarding an image forming job.

Also, when the USB control signal is input in the power saving mode, the CPU 120 retains the power saving mode and performs an operation corresponding to the USB control signal using the second memory 140. The USB control signal recited herein may be a status request signal of the image forming apparatus generated by an application provided in a host apparatus (not shown). For example, an apparatus comprising the application may be realized by a smart panel provided in the host apparatus. The smart panel is a panel that displays a status of the image forming apparatus through the host apparatus, and for example, the smart panel may periodically recognize the status of the image forming apparatus through the USB control communication. A user may know printing status, paper status, toner status, power on/off status of the image forming apparatus displayed on the host apparatus by the smart panel.

In addition, when the USB control signal is input in the power saving mode, the CPU 120 retains the power saving mode and performs an operation corresponding to the USB control signal using the second memory 140.

That is, if there is a request for status information of the image forming apparatus 100 in the smart panel when the image forming apparatus 100 is in the power saving mode, the CPU 120 may recognize whether the image forming apparatus 100 is in the power saving mode or not through the USB control communication.

The normal mode recited herein refers to a mode in which the image forming apparatus 100 performs a normal operation, and the power saving mode refers to a mode in which power supplied to the most of modules is interrupted or minimized in order to minimize power consumption when a system is idle. In order to reduce standby power in the power saving mode, power supplied to a main memory (external DRAM in general) is interrupted or a program in an unused internal memory (internal SRMA in general) of a SoC is driven after entering a self-refresh mode. For example, the SRAM may use a low capacity memory of about 128 KB. However, in some situations, a synchronous dynamic RAM (SDRAM) may be used and a read-only memory (ROM) may be additionally used along with the SRAM or the SDRAM.

The first memory 130 is a main memory used in the normal mode and may be realized as a non-volatile memory. For example, the first memory 130 may be a dynamic RAM (DRAM). The first memory 130 stores a program or an application that can support the USB communication in the normal mode, such as a USB driver.

The second memory 140 may be used in the power saving mode which requires less power than the normal mode. For example, a program for controlling the power saving mode may include at least one of a routine for determining whether a signal is input into the USB interface 110 or not, a routine for performing an operation corresponding to the USB control signal, and a routine required in a wake-up process for converting into the normal mode.

The second memory 140 stores a program or an application for supporting the power saving mode and may be realized as at lease one of a static RAM (SRAM) or a synchronous dynamic random access memory (SDRAM). Beside these, RAMBus, DRAM, double data rate (DDR)-SDRAM may be used.

Also, at least one of a read only memory (ROM) and a flash memory may be used to store a code necessary in the normal mode.

According to an exemplary embodiment, the second memory 140 may be realized as an SRAM. In this case, the SRAM may be used in copying and executing a code necessary in the normal mode and stored in the DRAM, ROM or flash memory.

The second memory 140 may be realized as an SRAM and may be used to execute a code stored in the ROM or the flash memory and necessary in the power saving mode.

Also, the second memory 140 may be realized as an SDRAM and may be used to execute a code stored in the ROM or the flash memory and necessary in the power saving mode.

Also, the second memory 140 may be used along with the first memory 130 in the normal mode. That is, the SRAM used as a buffer when an image is processed in the normal mode is reutilized as the second memory 140 in the power saving mode.

In the power saving mode, the CPU 120 may interrupt the power supplied to the first memory 130, reduce an operation frequency of the first memory 130, or control the first memory 130 to be retained in a self-refresh state.

Hereinafter, each memory will be described briefly for easy understanding of the present disclosure.

The SRAM maintains its data while power is being supplied to the memory. The SRAM does not require periodic multiple re-writing operations and thus maintains its data by writing it once. The SRMA is a low capacity memory and has a high operation speed, but has a drawback that it is expensive compared to the DRAM. Therefore, the SRAM is used in a memory which requires a high speed but does not require a high capacity such as a cache memory.

The DRAM should re-write data continuously in order to maintain its data unlike the SRAM. The DRAM is a mass storage memory and is slower than the SRAM. The DRAM is used as a main memory for most of systems.

The SDRAM operates keeping pace with a system clock. Since the SDRAM keeps pace with a system bus speed up to 200 MHz theoretically and operates depending on the system clock, a high system speed may be achieved.

The power supply unit 150 supplies power to the image forming apparatus 100.

Although the CPU 120 controls the image forming apparatus 100 in the above exemplary embodiment, in some situation, the CPU 120 may transmit a command to a controller (not shown) such that each element performs its corresponding operation.

Also, the image forming apparatus 100 may include a phase-locked loop (PLL) unit (not shown) to generate different operation frequencies. The PLL unit (not shown) may provide the generated operation frequencies to the CPU 120 and the first memory 130.

The function unit 160 performs diverse functions such as processing an image, and compressing or decompressing the image in order for an engine unit (not shown) to perform an image forming job such as printing, copying, and scanning.

The operation module 170 may include diverse function modules that are not included in the function unit 160 due to the limited capacity of the function unit 160. The operation module 170 may include at least one function module, and the at least one function module may be realized as a single chip.

The CPU 120 may convert the normal mode into the power saving mode if a predetermined condition is satisfied. For example, there may be no command during a predetermined time. However, this is merely an example. There are diverse situations as a mode conversion event.

Also, the CPU 120 is converted from the power saving mode into the normal mode if a predetermined condition is satisfied. For example, in the case of a printer, if there is an event such as panel key input, printing service request, or fax ring, the CPU 120 is converted from the power saving mode into the normal mode.

When the CPU 120 is required to be converted from the normal mode into the power saving mode as described above, the CPU 120 may copy a program for controlling the power saving mode from the first memory 130 to an executable area of the second memory 140, or may copy a program stored in an extra ROM or flash memory to an executable area of the second memory 140. The program for controlling the power saving mode includes a USB driver, and the USB driver may include only a routine to recognize an interrupt from a control endpoint or a data endpoint, a routine responsible for processing a control endpoint, and a routine required in a wake-up process to return to the normal mode. Accordingly, the program for controlling the power saving mode has less capacity than a USB program stored in the first memory 130 used in the normal mode.

If a code has been completely copied, the power supplied to the entire system modules including the first memory 130 is interrupted and the image forming apparatus 100 enters the power saving mode.

The code may be copied from the flash memory or the ROM to the DRAM when the image forming apparatus 100 is booted or may be copied to the SRAM when the image forming apparatus 100 enters the power saving mode.

In the power saving mode, the CPU 120 checks whether there is an interrupt from the USB interface 110.

If there is the interrupt from the USB interface 110, the CPU 120 determines whether the interrupt is from the control endpoint or the data endpoint.

If the interrupt is not from the control endpoint, for example, if the interrupt is from the data endpoint (for example, if there is a request for an image forming job), the CPU 120 read outs printer data and stores it in the second memory 140, and then returns to the normal mode to process a corresponding service. However, this is merely an example, and the CPU 120 may return to the normal mode according to whether the USB is in a first in first out (FIFO) mode or a direct memory access (DMA) mode and may store the data in the first memory 130.

More specifically, if there is the interrupt from the data endpoint, that is, if there is a specific job command, the data of the second memory 140 is stored in the first memory 130 which is accessible to the USB driver in the normal mode. In this case, all hardware is normalized and the USB driver is driven to process the interrupt and subsequent events.

That is, the image forming apparatus 100 according to an exemplary embodiment is configured to process only the service from the control endpoint in the normal mode. This is due to a limited capacity of the second memory 140 which may be realized as an SRAM, an SDAM, and a ROM.

Also, the USB interface 110, the CPU 120, the second memory 140, the function unit 150, and the PLL unit (not shown) described above may be integrated into a single chip such as an application-specific integrated circuit (ASIC). Accordingly, the image forming apparatus 100 can realize a SoC.

Also, the image forming apparatus 100 may include the engine unit (not shown) to perform an image forming job such as printing, scanning, and copying in communication with the ASIC unit.

Figure 1B:
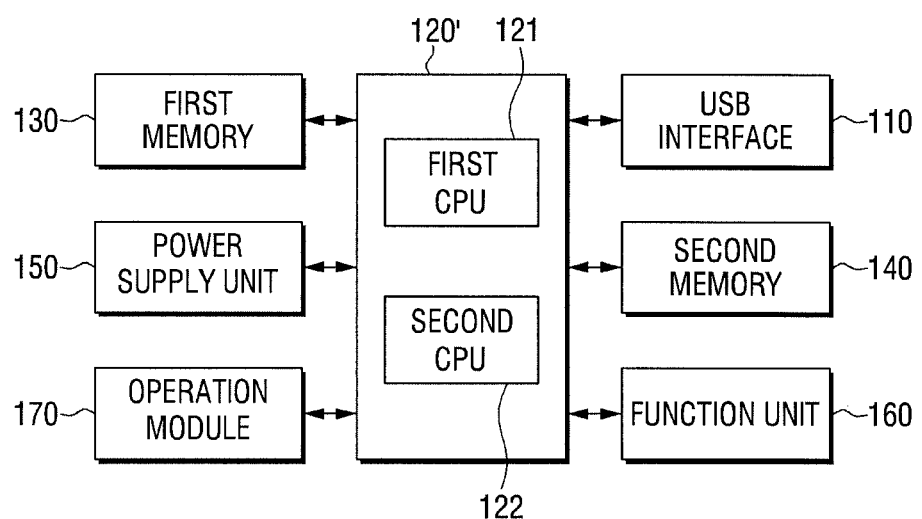
FIG. 1B is a block diagram illustrating an image forming apparatus according to another exemplary embodiment.

FIG. 1B is a block diagram illustrating an image forming apparatus according to another exemplary embodiment.

Referring to FIG. 1B, the CPU 120' may include a first CPU 121 for supporting a normal mode and a second CPU 122 for supporting a power saving mode according to a situation.

The first CPU 121 performs an operation using the first memory 130 in the normal mode and is deactivated when the normal mode is converted into the power saving mode.

The second CPU 122 performs an operation using the second memory 140 in the power saving mode. More specifically, if a USB data signal is input in the power saving mode, the second CPU 122 activates the first CPU 121 to convert the power saving mode into the normal mode, and if a USB control signal is input in the power saving mode, the second CPU 11 retains the power saving mode and performs an operation corresponding to the USB control signal using the second memory 140.

Also, in the power saving mode, the second CPU 122 may interrupt the power supplied to the first CPU 121, may lower the operation frequency of the first memory 130, or may control the first memory 130 to be in a self-refresh mode.

That is, the CPU 120 shown in FIG. 1A is realized by a main controller that supports both the normal mode and the power saving mode, whereas the CPU 120' shown in FIG. 1B is realized by including a main controller for supporting the normal mode and a sub-controller for supporting the power saving mode, separately.

If the CPU 120 is a main controller for supporting both the normal mode and the power saving mode as shown in FIG. 1A, that is, if a main firmware involved in the control of the normal mode and a micro firmware involved in the control of the power saving mode are integrated into a single chip, the power saving mode is realized by lowering the frequency of the main controller or by configuring a gated clock in designing the main controller in order to prevent a clock from being input into idle blocks in a standby mode. In this case, the micro firmware may be mounted in an internal memory (SRAM) of the main controller. Since the SRAM maintain its contents without refresh (for example, without recharging), the SRAM has a faster response speed than the DRAM and thus the power saving mode is converted into the normal mode rapidly.

On the other hand, if the main controller for supporting the normal mode and the sub-controller for supporting the power saving mode are provided separately as shown in FIG. 1B, that is, if the main firmware involved in the control of the normal mode and the micro firmware involved in the control of the power saving mode are separate chips, the power supplied to the elements other than the sub-controller is interrupted in the power saving mode. In this case, the sub-controller checks whether there is an interrupt from the USB interface in the power saving mode or not, and, if there is an interrupt caused by USB control communication, the sub-controller processes an event corresponding to the outstanding interrupt. If there is an interrupt caused by USB data communication, the main controller is activated.

According to another exemplary embodiment, a SoC unit which may be mounted in an apparatus including a volatile memory, may include an USB interface which receives an USB control signal or an USB data signal from an external apparatus connected to the apparatus, and a CPU which performs an operation using the volatile memory in the normal mode and performs an operation using a memory in the power saving mode. If the USB data signal is input in the power saving mode, the CPU converts the power saving mode into the normal mode, and, if the USB control signal is input in the power saving mode, the CPU retains the power saving mode and performs an operation corresponding to the USB control signal using the memory.

Hereinafter, only the case where the CPU 120 is a main controller for supporting both the normal mode and the power saving mode, i.e., the case where the main firmware involved in the control of the normal mode and the micro firmware involved in the control of the power saving mode are integrated into a single chip will be explained. However, it should be understood that diverse exemplary embodiments may be applied if the CPU 120' includes the main controller for supporting the normal mode and the sub-controller for supporting the power saving mode as shown in FIG. 1B.

Figure 2A:
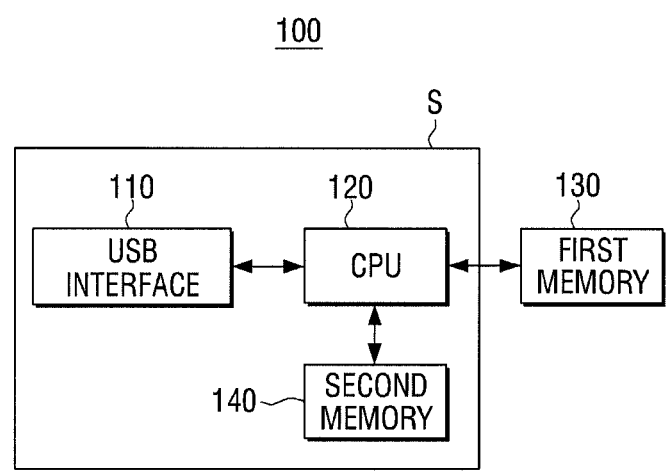
FIGS. 2A to 2C are views illustrating diverse examples of the image forming apparatus of FIG. 1A.
Figure 2B:
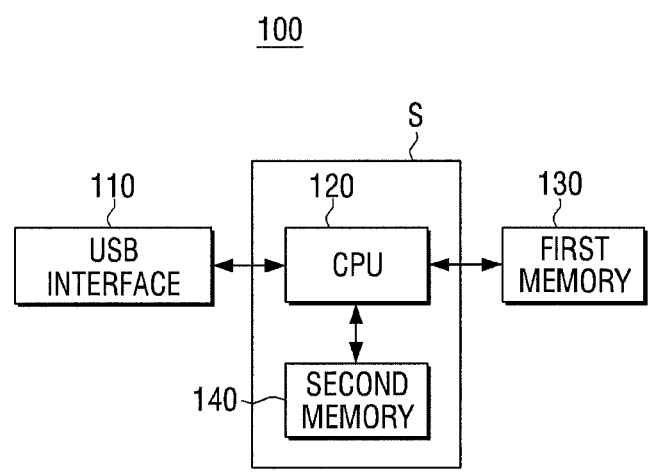
Figure 2C:
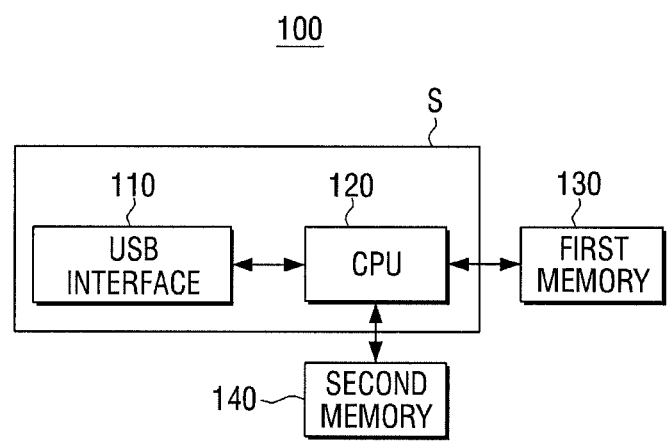

FIGS. 2A to 2C are views illustrating diverse examples of the image forming apparatus as shown in FIG. 1A.

In FIGS. 2A to 2C, only the USB interface 110, the CPU 120, the first memory 130, and the second memory 149 of FIG. 1A are illustrated for the sake of simplicity.

As shown in FIG. 2A, the USB interface 110, the CPU 120, and the second memory 140 may be provided within a single SoC, and the first memory 130 may be provided outside the SoC. In this case, the second memory 140 may be an SRAM that is reused as a buffer in processing an image or may be a separate SRAM other than the SRAM that is reused as a buffer in processing an image.

Also, as shown in FIG. 2B, the USB interface 110 and the CPU 120 may be provided within a single SoC, and the first memory 130 and the second memory 140 may be provided outside the SoC.

Also, as shown in FIG. 2C, the CPU 120 and the second memory 140 may be provided within a single SoC, and the USB interface 110 and the first memory 140 may be provided outside the SoC. In this case, the USB interface 110 outside the SoC may be realized using a printer command language (PCL) inside the SoC.

Figure 3A:
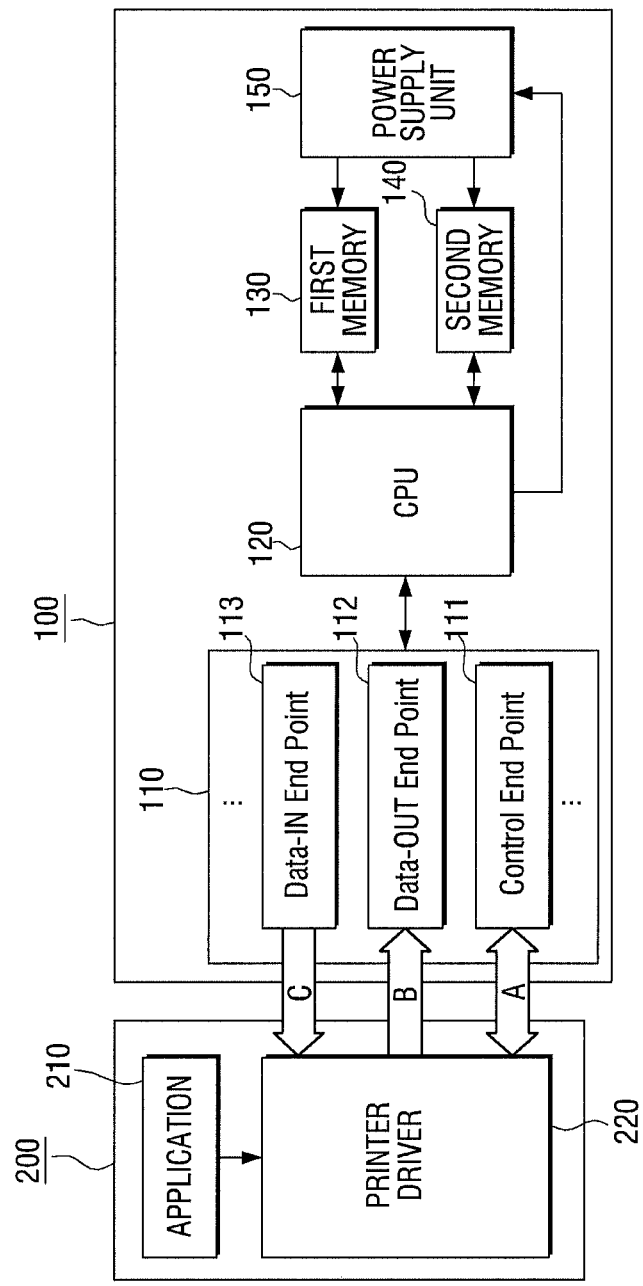
FIGS. 3A to 4 are block diagrams to explain a relationship between the image forming apparatus of FIG. 1A and a host apparatus.

FIG. 3A is a block diagram to explain a relationship between the image forming apparatus of FIG. 1A and a host apparatus. Among the elements shown in FIG. 3A, the same element as those of FIG. 1A and FIGS. 2A to 2C are not explained in detail.

A host apparatus 200 may be realized as a personal computer (PC). In some situation, the host apparatus 200 may be a personal digital assistant (PDA), a portable multiplayer (PMP), a TV, a server, or etc.

The host apparatus 200 includes an application 210 and a host controller 220.

The application 210 may be software for supporting a USB function in an operation system (OS).

The host controller 220 is a USB bus interface of the host apparatus 200, and includes all software or hardware to enable a USB device (that is, the image forming apparatus 100) to be connected to the host apparatus 200.

Furthermore, the host apparatus 200 may include a printer driver (not shown) for converting printing data written by an application into a printer language readable by the image forming apparatus 100. The printer driver may be included in the host controller 220. Also, the host apparatus 200 may include general elements such as an input unit (not shown) and a display unit (not shown).

Hereinafter, general concepts of an endpoint and a pipe will be explained briefly for easy understanding of the present disclosure.

The endpoint is a logical port and a terminal end in a communication flow, and has a unique ID. The endpoint has information about a direction of data transmission (an input endpoint and an output endpoint). The endpoint may describe information such as an access frequency of a bus/requirements when the bus is delayed, requirements for bandwidth, the number of endpoints, requirements for error handling, a maximum size of packet that is acceptable to the endpoint, a transmission type, and a transmission direction.

The pipe is a connection ring between the endpoint of a single device and software of a host. The pipe is divided into a stream pipe and a message pipe according to its characteristic. The stream pipe and the message pipe are different from each other and are mutually exclusive. The stream pipe has no USB format defined and supports a one-way communication, whereas the message pipe has a defined USB format and supports a one-way communication.

The endpoint and the pipe are described in detail in the USB specification and thus a further detailed description is omitted.

The image forming apparatus 100 communicates with the host apparatus 200 through a USB, and the USB interface 110 may include a control endpoint 111 which is a logical port, and a plurality of data endpoints 112, 113 which are also logical ports. The endpoints other than the control endpoint 111 are slightly different according to how to transmit data, but may be regarded as a simple logical port for transmitting data. Therefore, hereinafter, the endpoint is called "data endpoint".

The control endpoint 111 is a logical port that determines whether the image forming apparatus 100 is connected to the host apparatus 200 or not through a series of enumerations, and that obtains information of the image forming apparatus 100 if the image forming apparatus 100 is connected or sets the image forming apparatus 100 to communicate with the host apparatus 200. That is, the control endpoint 111 is always used when the enumeration is performed and the device on the bus is operated (when a device is recognized). That is, the control endpoint should be a fundamental endpoint for connecting/disconnecting/recognizing a device and should be carried by any device, and also, should be controllable.

The control endpoint 111 uses the message pipe unlike the data endpoint so that the control endpoint 111 can perform a two-way communication.

The data endpoints 112, 113 are designed to transmit data and may be at least one type of a bulk type in/out endpoint, an isochronous type in/out endpoint, and an interrupt type in/out endpoint.

The bulk type in/out endpoint is for transmitting bulky data accurately at any time, and retransmits the data if there is a transmission error in the bus. For example, the bulk type in/out endpoint may be used to transmit data of a storage device such as a hard disk. Also, the bulk type in/out endpoint uses the stream pipe and thus has a single direction.

The isochronous type in/out endpoint is mainly used in a device that regards a real-time property of an audio as important and likewise uses the stream pipe and thus has a single direction.

The interrupt type in/out endpoint is mainly used in a device that requires periodic signal transmission and reception such as a hub and likewise uses the stream pipe and thus has a single direction.

Since the image forming apparatus 100 requires transmission of bulky data, the bulk type in/out endpoint may be used.

Also, the number of the data endpoints 112, 113 and the directions of them may be selected according to the interface characteristic. Also, the number and function of the data endpoints 112, 113 are selectively determined by the manufacturer of the apparatus according to the specification of the apparatus.

Figure 3B:
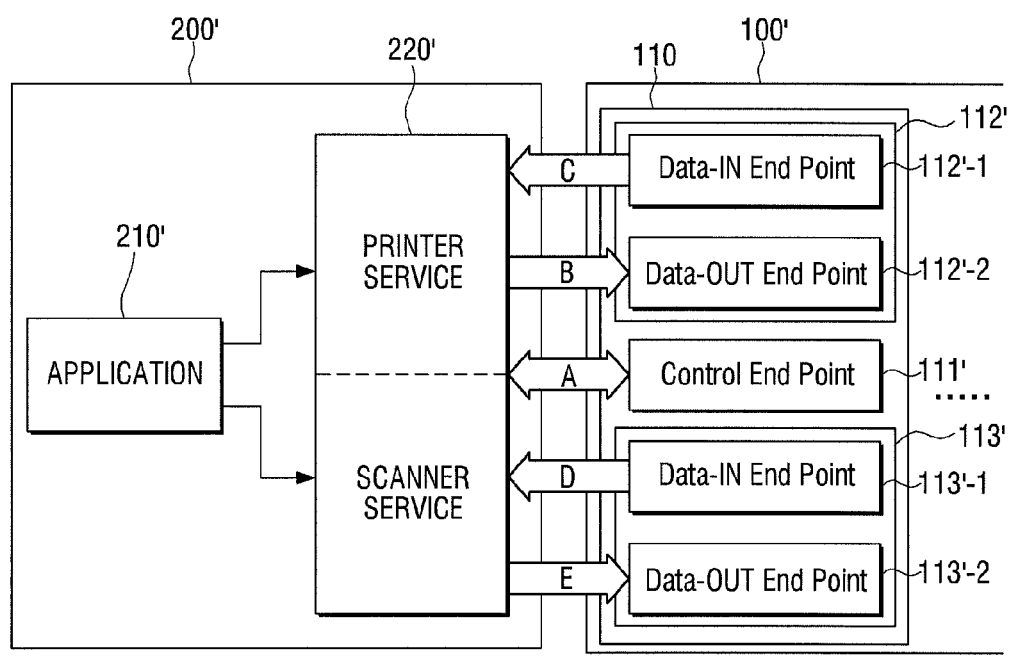

For example, in the case of a MFP, the endpoint is configured as shown in FIG. 3B. The endpoint is a logical port rather than a physical port but is schematized in the drawing for the convenience of explanation.

Referring to FIG. 3B, if an endpoint I 112 is dedicated for a printer and an endpoint II 113 is dedicated for a scanner, an OUT endpoint 112'-2 of the endpoint I 112' is an end point for receiving printing data from a host apparatus 200', and an IN endpoint 113'-1 of the endpoint II 113' is an end point for transmitting scanned data to the host apparatus 200'.

The CPU 120 controls the overall operation of the normal mode in which the original function of the image forming apparatus 100 such as copying, scanning, and faxing is performed.

Also, the CPU 120 is set to be converted from the normal mode into the power saving mode if a predetermined condition is satisfied. For example, if no job command is input for a predetermined time, the normal mode is converted into the power saving mode. However, this is merely an example. If a specific user command is input, the normal mode may be converted into the power saving mode.

That is, if the image forming apparatus 100 does not perform any job or if there is no job command to copy, scan, or fax, which may be input through a panel of the image forming apparatus 100, an USB, or diverse user interfaces such as a network, for a predetermined time, the CPU 120 may convert the normal mode into the power saving mode.

If the normal mode should be converted into the power saving mode, the CPU 120 copies a program for controlling the power saving mode from the first memory to an executable area of the second memory 140. The first memory 130 is a main memory that stores a program or an application necessary for the overall operation of the image forming apparatus 100, and may be realized as a DRAM, and the second memory 140 may be realized as at least one of an SRAM, an SDRAM, and a ROM as described above.

The program for controlling the power saving mode includes a USB driver, and the USB driver may include only a routine responsible for a process of the control endpoint and a routine required in a wake-up process for returning to the normal mode. Accordingly, since a low power USB program stored in the second memory 140 has less capacity than a USB program stored in the first memory 130, the second memory 140 may be realized as a small capacity memory.

If the program has been completely copied, power supplied to the entire system modules including the first memory 130 is interrupted and the image forming apparatus 100 enters the power saving mode.

In the power saving mode, the CPU 120 checks whether there is an interrupt from the control endpoint 111 or the data endpoint 112.

If there is an interrupt from the control endpoint 111, the CPU 120 processes a corresponding event by executing the program or the application stored in the second memory 140.

If the interrupt is not from the control endpoint 111, that is, if there is an interrupt from the data endpoint 112, the CPU 120 reads out printer data and stores it in the second memory 140, and then returns to the normal mode to process a corresponding service. However, this is merely an example, and the normal mode may be restored and the data may be stored in the first memory 130 according to whether the USB is a FIFO mode or the DMA mode.

More specifically, if there is an interrupt from the data endpoint 112, that is, if there is a specific job command, the data in the second memory 140 is stored in the first memory 130 which is accessible to the USB driver in the normal mode. In this case, all hardware is normalized and the USB driver is driven to process the outstanding interrupt and subsequent events.

The elements and their arrangement order shown in FIGS. 1A to 3B are merely an example and some of them may be deleted and an additional element may be added. Also, the order may be changed.

Figure 4:
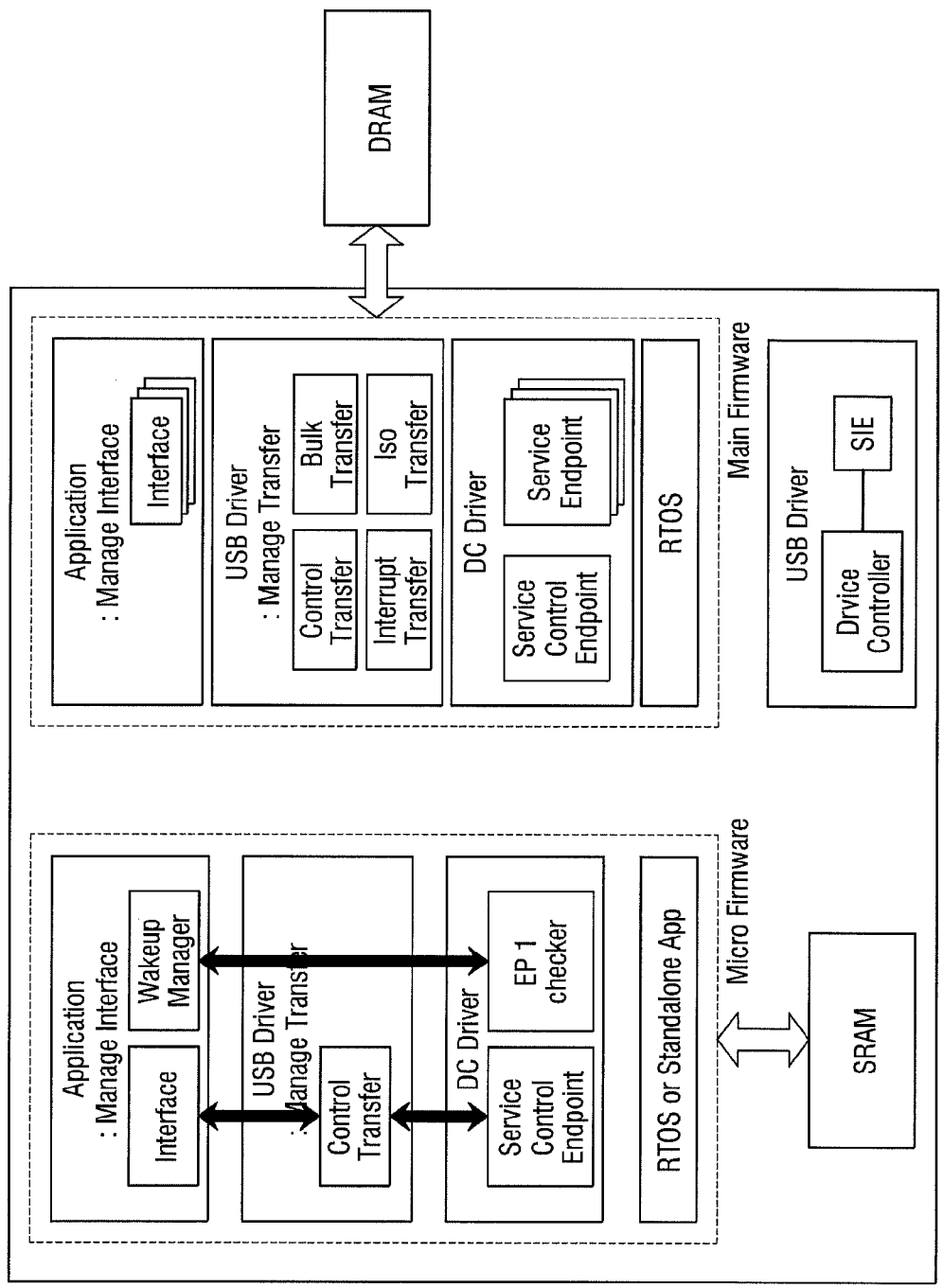

FIG. 4 is a view illustrating a system configuration to explain operations in the normal mode and the power saving mode according to an exemplary embodiment.

Referring to FIG. 4, if an event occurs in the normal mode, for example, if a print command is input through a USB in the normal mode, a USB device controller recognizes the event as an interrupt and a CPU is informed of the occurrence of the interrupt by an interrupt controller.

Upon receiving the interrupt, the CPU processes the interrupt in a main firmware of an external DRAM and is ready to print.

If no print command is input for a predetermined time, the CPU tries to enter the power saving mode. When the CPU enters the power saving mode, the CPU copies a micro firmware from the external DRAM to an executable area of an internal SRAM, and the micro firmware operates instead of the main firmware. At this time, the power supplied to the external DRAM is interrupted or enters a self-refresh state. The micro firmware includes the USB driver, and the USB driver includes only a routine for processing the control endpoint and a minimum routine for receiving the print command. The minimum routine for receiving the print command confirms that an interrupt has occurred in the endpoint which has received the print command. That is, in the related art, if the DRAM is interrupted, no service is available through the USB. However, in the present disclosure, a minimum driver is driven in order to retain the connection with a device in the SRAM. If an interrupt occurs in this endpoint, a wakeup manager notifies that the normal mode should be restored.

FIG. 5 is a view illustrating a USB packet analysis frame according to an exemplary embodiment.

Referring to FIG. 5, the print driver 220 of the host apparatus 200 frequently transmits a manufacturer restriction request or a class restriction request to the image forming apparatus 100 through a control endpoint (endpoint 0: ENDP 0). After that, bulk transmission according to a print command is performed through the endpoint 1 (See "A"). This means that continuous request may be transmitted through the control endpoint even in the power saving mode. This manufacturer restriction request is different depending on the manufacturer.

If the image forming apparatus 100 according to an exemplary embodiment receives the request as shown in FIG. 5, all requests for the control endpoint from Transfer 48 to 64 are processed by the sub-controller, and, if the print command is received at the end point 1 as in transfer 65, a corresponding event is processed by the main controller after the normal mode has been restored.

Figure 6:
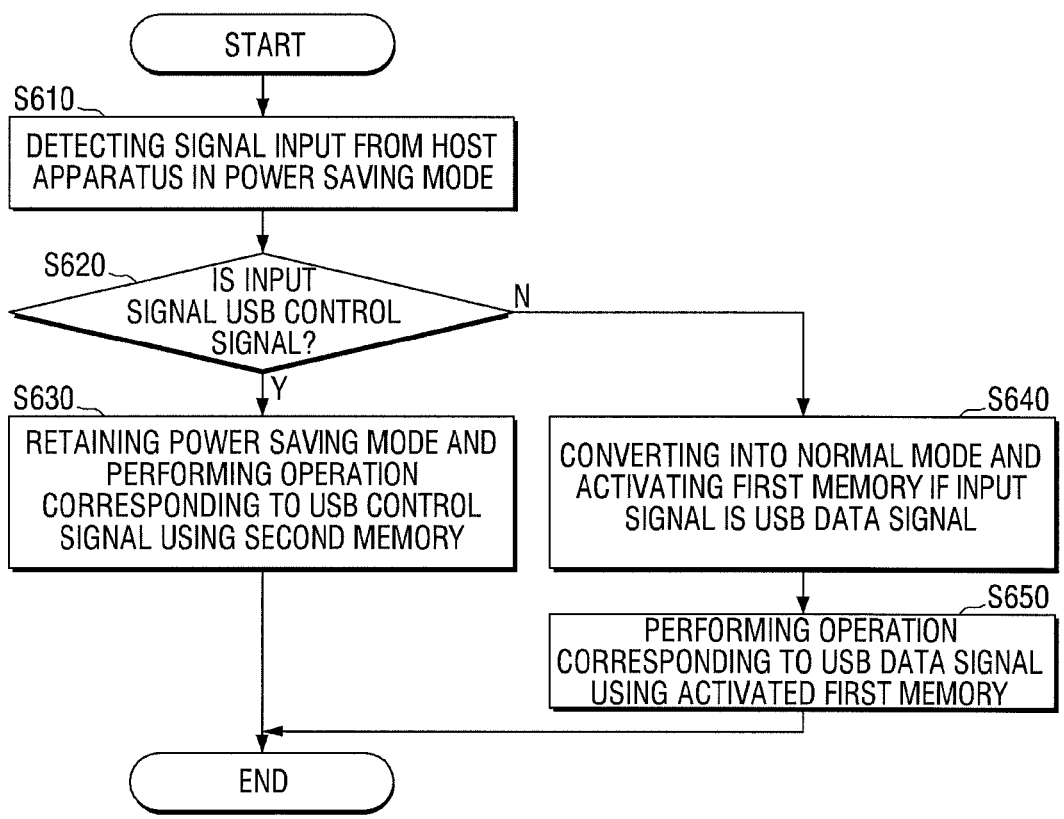
FIG. 6 is a flowchart illustrating a driving method of an image forming apparatus according to an exemplary embodiment.

FIG. 6 is a flowchart illustrating a driving method of an image forming apparatus according to an exemplary embodiment.

Referring to FIG. 6, a driving method of an image forming apparatus which is connected to a host apparatus, includes a first memory, a second memory, and an USB interface to receive a USB control signal or a USB data signal from the host apparatus, and operates in a normal mode using the first memory or in a power saving mode using the second memory is explained. In this method, if a signal input from the host apparatus is detected in the power saving mode (S610), it is determined whether the signal is a USB control signal or not (S620).

If the input signal is the USB control signal (S620: Y), the power saving mode is retained and an operation corresponding to the USB control signal is performed using the second memory (S630).

If the input signal is not the USB control signal (S620: N), that is, if the input signal is a USB data signal, the power saving mode is converted into the normal mode and the first memory is activated (S640).

An operation corresponding to the USB data signal is performed using the activated first memory (S650).

The USB data signal may be a request signal for an image forming job.

Also, the second memory may be used along with the first memory in the normal mode.

Also, if the normal mode is converted into the power saving mode, a program stored in the first memory for controlling the power saving mode is copied to the second memory, and an operation frequency of the first memory may be lowered or the first memory is retained in a self-refresh state.

The program for controlling the power saving mode may include at least one of a program for determining whether the USB control signal or the USB data signal is input, a program for executing the operation corresponding to the USB control signal, and a program for converting into the normal mode according to a type of input USB signal.

The USB control signal may be input through the control endpoint, and the USB data signal may be input through the bulk type in/out endpoint. The endpoint has been described above and thus a detailed description is omitted.

Figure 7:
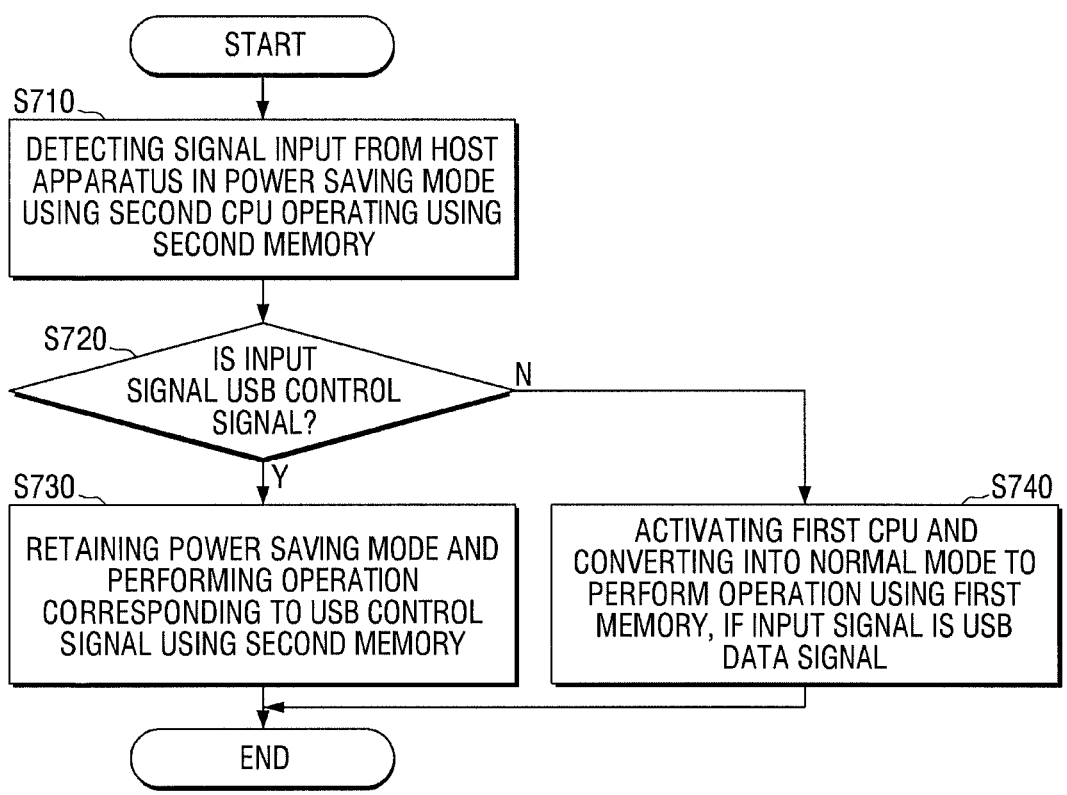
FIG. 7 is a flowchart illustrating a driving method of an image forming apparatus according to another exemplary embodiment.

FIG. 7 is a flowchart illustrating a driving method of an image forming apparatus according to another exemplary embodiment.

Referring to FIG. 7, a driving method of an image forming apparatus which is connected to a host apparatus, and includes a first memory, a first CPU which operates using the first memory in the normal mode and is inactivated if the normal mode is converted into a power saving mode, and a second CPU which operates using a second memory in the power saving mode is explained. In this method, if a signal input from the host apparatus in the power saving mode is detected (S710), it is determined whether the input signal is a USB control signal or not (S720).

If the signal input from the host apparatus is the USB control signal (S720: Y), the power saving mode is retained and an operation corresponding to the USB control signal is performed using the second memory (S730).

If the signal input from the host apparatus is not the USB control signal (S720: N), that is, if the signal input from the host apparatus is a USB data signal, the first CPU is activated and the power saving mode is converted into the normal mode (S740).

The USB data signal may be a request signal for an image forming job.

Also, the second memory may be used along with the first memory in the normal mode. For example, the second memory may be realized as an SRAM used to perform an image forming job.

If the normal mode is converted into the power saving mode, a program stored in the first memory for controlling the power saving mode is copied to the second memory and power supplied to the first CPU is interrupted.

The program for controlling the power saving mode may include a routine for determining whether a signal is input to a USB interface or not, a routine for performing an operation corresponding to the USB control signal, and a routine required in a wake up process for converting into the normal mode.

Also, the USB control signal may be input through the control endpoint and the USB data signal may be input through the bulk type in/out endpoint. The endpoint has been described above and thus a detailed description is omitted.

According to another exemplary embodiment, a driving method of a SoC unit, which is mountable on an apparatus having a volatile memory accessible in a normal mode, and includes a USB interface to receive a USB control signal or a USB data signal from an external apparatus connected to the apparatus, and a memory, includes: detecting a signal input from the apparatus in a power saving mode, converting the power saving mode into a normal mode if the input signal is a USB data signal, and, if the input signal is a USB control signal, retaining the power saving mode and performing an operation corresponding to the USB control signal using the memory in the SoC unit.

The USB control communication may be performed through the control endpoint, and the USB data communication may be performed through the bulk type in/out endpoint.

The second memory may be realized as at least one of an SRAM, SDRAM, and ROM.

The USB interface, a second memory, and a CPU for controlling the normal mode and the power saving mode may be included in the SoC unit.

Also, the present disclosure may include a computer readable recording medium which includes a program for executing the above-described driving method of the image forming apparatus. The computer readable recording medium includes any type of recording apparatuses on which data readable by a computer system is recorded. The examples of the computer recordable recording medium are a ROM, a RAM, a CD-ROM, a magnetic tape, a floppy disk, and an optical data storage device. The computer readable recording medium is distributed in the computer system connected over a network and thus a code readable by the computer is stored and executed in a distributed manner.

Although only the USB communication has been described above, the present disclosures may be applied to diverse communication schemes similar to the USB communication scheme, such as network communication, Bluetooth, high definition multimedia interface (HDMI), peripheral component interconnect (PCI) express, Ethernet, ZigBee, FireWire, CAN, IEEE1394, PS/2, accelerated graphics port (AGP), industry standard architecture (ISA), micro channel architecture (MCA), extended industry standard architecture (EISA), video electronics standard architecture (VESA), and etc.

That is, the present disclosure provides a method in which the power saving mode is converted into the normal mode if an image forming job is received through a printing job reception port in the network communication.

As described above, normal USB communication is possible even if the power supplied to the main memory in which the USB driver is driven is interrupted. By reusing a small SRAM in the SoC, an increased cost due to an additional SRAM is solved and the power saving mode is achieved efficiently.

In the above exemplary embodiments, the image forming apparatus has been described, but this is merely an example, and any apparatus that is USB communicable can be applied.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. An image forming apparatus which is connected to a host apparatus, comprising:
   a first memory;
   a second memory;
   a universal serial bus (USB) interface to receive a USB control signal or a USB data signal from the host apparatus; and
   a central processing unit (CPU) operating in a normal mode using the first memory or in a power saving mode using the second memory,
   wherein, if the USB data signal is input in the power saving mode, the CPU activates the first memory and converts the power saving mode into the normal mode, and, if the USB control signal is input in the power saving mode, the CPU retains the power saving mode and performs an operation corresponding to the USB control signal using the second memory, and
   wherein the USB control signal is input through a control endpoint, and the USB data signal is input through a bulk type in/out endpoint.

2. The image forming apparatus as claimed in claim 1, wherein the USB data signal is a request signal for an image forming job.

3. The image forming apparatus as claimed in claim 1, wherein the CPU interrupts power supplied to the first memory or retains the first memory in a self-refresh state in the power saving mode.

4. The image forming apparatus as claimed in claim 1, wherein the second memory and the CPU are provided inside a system on chip (SoC), and the USB interface is provided inside or outside the SoC.

5. The image forming apparatus as claimed in claim 1, wherein, if the image forming apparatus enters the power saving mode, the CPU copies a program for controlling the power saving mode from the first memory to the second memory.

6. The image forming apparatus as claimed in claim 5, wherein the program for controlling the power saving mode comprises at least one of a routine for determining whether a signal is input to the USB interface or not, a routine for performing an operation according to the USB control signal, and a routine required in a wake up process for converting the power saving mode into the normal mode.

7. A driving method of an image forming apparatus which is connected to a host apparatus, the image forming apparatus comprising a first memory, a second memory, and a USB interface to receive a USB control signal or a USB data signal from the host apparatus, and the image forming apparatus operating in a normal mode using the first memory or in a power saving mode using the second memory, the driving method comprising:
   detecting a signal that is input from the host apparatus in the power saving mode; and
   if the input signal is the USB control signal, retaining the power saving mode and performing an operation corresponding to the USB control signal using the second memory, and if the input signal is the USB data signal, converting the power saving mode into the normal mode to activate the first memory and performing an operation corresponding to the USB data signal using the activated first memory,
   wherein the USB control signal is input through a control end point and the USB data signal is input through a bulk type in/out endpoint.

8. The driving method as claimed in claim 7, wherein the USB data signal is a request signal for an image forming job.

9. The driving method as claimed in claim 7, wherein, in the power saving mode, power supplied to the first memory is interrupted or the first memory is retained in a self-refresh state.

10. The driving method as claimed in claim 7, further comprising, if the image forming apparatus enters the power saving mode, copying a program stored in the first memory for controlling the power saving mode to the second memory.

11. The driving method as claimed in claim 10, wherein the program for controlling the power saving mode comprises at least one of a routine for determining whether a signal is input to the USB interface or not, a routine for performing an operation corresponding to the USB control signal, and a routine required in a wake-up process for converting the power saving mode into the normal mode.

* * * * *